(12) United States Patent
Sumiyoshi

(10) Patent No.: US 8,755,677 B2
(45) Date of Patent: Jun. 17, 2014

(54) MOVING-PICTURE PROCESSING DEVICE AND MOVING-PICTURE PROCESSING METHOD

(75) Inventor: Yasuaki Sumiyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 820 days.

(21) Appl. No.: 12/615,952

(22) Filed: Nov. 10, 2009

(65) Prior Publication Data

US 2010/0121982 A1     May 13, 2010

(30) Foreign Application Priority Data

Nov. 10, 2008  (JP) ................................. 2008-287632

(51) Int. Cl.
*H04N 5/93*        (2006.01)

(52) U.S. Cl.
USPC ............................ 386/354; 709/232; 386/235

(58) Field of Classification Search
USPC ......................................................... 709/246
See application file for complete search history.

(56) References Cited

U.S. PATENT DOCUMENTS

| | | | |
|---|---|---|---|
| 2004/0032348 A1* | 2/2004 | Lai et al. | 341/50 |
| 2005/0080911 A1* | 4/2005 | Stiers et al. | 709/230 |
| 2006/0026294 A1* | 2/2006 | Virdi et al. | 709/232 |
| 2006/0072831 A1* | 4/2006 | Pallister | 382/232 |
| 2007/0189386 A1* | 8/2007 | Imagawa et al. | 375/240.12 |
| 2008/0079714 A1* | 4/2008 | Shearer | 345/419 |
| 2008/0282299 A1* | 11/2008 | Koat et al. | 725/93 |
| 2009/0016429 A1* | 1/2009 | Kokojima et al. | 375/240.01 |

FOREIGN PATENT DOCUMENTS

| | | |
|---|---|---|
| JP | 2003324733 A | 11/2003 |
| JP | 2004192140 A | 7/2004 |
| JP | 2004-222124 A | 8/2004 |
| WO | 2004027638 A | 4/2004 |
| WO | 2006036661 A | 4/2006 |

OTHER PUBLICATIONS

European Search Report for EP 09 17 4918 completed Feb. 15, 2012.
Japanese Office Action for JP2008-287632 mailed on Jan. 15, 2013.

* cited by examiner

*Primary Examiner* — Hamza Algibhah

(57) ABSTRACT

A moving-picture processing device distributing moving-picture data to an information processing terminal includes: a division processing unit for generating a plurality of divided moving-picture data obtained by dividing moving-picture data, a moving-picture processing unit for subjecting each data item of said plurality of divided moving-picture data to a distribution process for distributing moving-picture data, and a distribution processing unit for sequentially distributing, by each arbitrary data amount as distribution data to the information processing terminal, each data item of said plurality of divided moving-picture data that have undergone the distribution process. The moving-picture processing unit executes the distribution process in parallel.

9 Claims, 9 Drawing Sheets

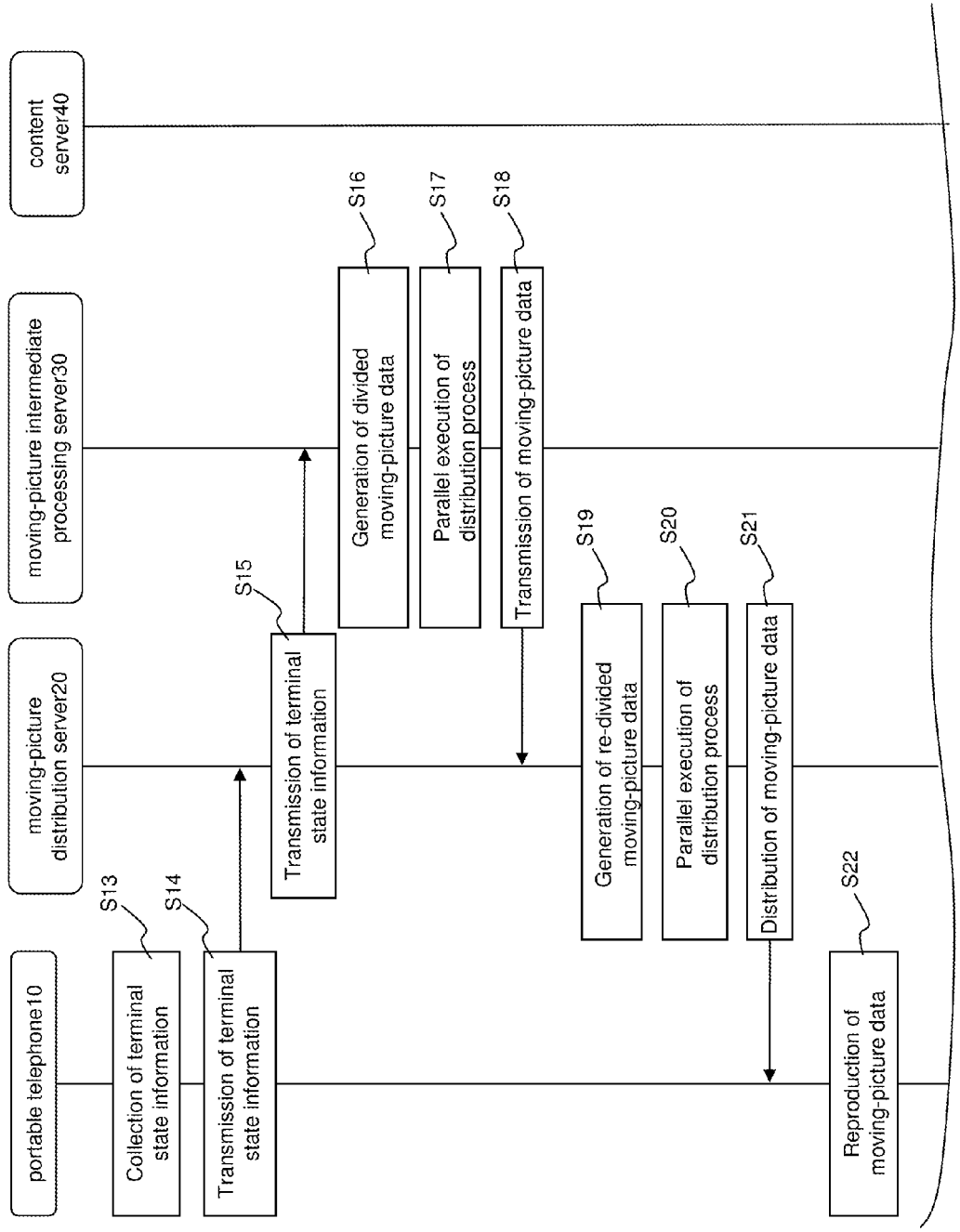

MOVING-PICTURE PROCESSING DEVICE AND MOVING-PICTURE PROCESSING METHOD

This application is based upon and claims the benefit of priority from Japanese patent application No. 2008-287632, filed on Nov. 10, 2008, the disclosure of which is incorporated herein in its entirety by reference.

BACKGROUND OF THE INVENTION

1. Field of the Invention

The present invention relates to a moving-picture processing device and a moving-picture processing method for distributing moving-picture data to an image-processing terminal.

2. Description of the Related Art

In recent years, portable telephones include functions for receiving the distribution of moving-picture data by way of radio communication and reproducing the received moving-picture data. Corresponding to these functions, a moving-picture distribution server that distributes moving-picture data converts moving-picture data to a format that can be reproduced on a portable telephone that is the distribution destination and distributes the result, as disclosed in Patent Document 1. The size and other attributes of moving-picture data that can be reproduced vary according to the type of portable telephone. As a result, a distribution server converts the format of the moving-picture data in accordance with the type of portable telephone.

Patent Document 1: JP-A-2004-222124

The moving-picture distribution server in the technology disclosed in the above-described Patent Document 1 fetches information about the portable telephone from the portable telephone and then converts moving-picture data such that appropriate reproduction is possible in that portable telephone. This conversion of the moving-picture data takes time, and a delay is therefore produced from a request for the distribution of moving-picture data until the reproduction of the moving-picture data on the portable telephone. This delay occurs not only when a portable telephone is used but can also occur in any information-processing terminal that receives the distribution of the moving-picture data.

This delay may cause a problem in which the user of an information-processing terminal will experience some dissatisfaction in viewing the moving-picture data that is distributed.

SUMMARY OF THE INVENTION

It is an object of the present invention to provide a moving-picture processing device and a moving-picture processing method that can improve the degree of user satisfaction when viewing moving-picture data that are distributed.

To achieve the above-described object, the present invention comprises a moving-picture processing device distributing moving-picture data to an information-processing terminal and includes:

a division processing unit generating a plurality of divided moving-picture data obtained by dividing the moving-picture data;

a moving-picture processing unit subjecting each data item of the plurality of divided moving-picture data to a distribution process for distributing the moving-picture data; and a distribution processing unit sequentially distributing, to the information-processing terminal as distribution data by each arbitrary amount of data, each data item of the plurality of divided moving-picture data that have undergone the distribution process;

wherein the moving-picture processing unit executes the distribution process in parallel.

In addition, a moving-picture processing method in a moving-picture processing device for distributing moving-picture data to an information-processing terminal includes:

a dividing process of generating a plurality of divided moving-picture data obtained by dividing the moving-picture data;

a moving-picture process of executing in parallel a distribution process that is implemented upon each data item of the plurality of divided moving-picture data to distribute the moving-picture data; and a moving-picture data distribution process of sequentially distributing, to the information-processing terminal as distribution data by each arbitrary data amount, each data item of the plurality of divided moving-picture data that have undergone the distribution process.

The moving-picture processing device according to the present invention includes the division processing unit generating a plurality of items of divided moving-picture data obtained by dividing the moving-picture data, the moving-picture processing unit subjecting each data item of the plurality of divided moving-picture data to a distribution process for distributing moving-picture data; and the distribution processing unit sequentially distributing, to an information processing terminal as distribution data by each arbitrary amount of data, each data item of the plurality of divided moving-picture data that have undergone the distribution process. The moving-picture processing unit then executes the distribution process in parallel. In this way, moving-picture data can be distributed to an information-processing terminal rapidly.

The present invention can therefore improve the degree of user satisfaction when viewing moving-picture data that have been distributed.

The above and other objects, features, and advantages of the present invention will become apparent from the following description with reference to the accompanying drawings, which illustrate examples of the present invention.

BRIEF DESCRIPTION OF THE DRAWINGS

FIG. 9 is a sequence chart for explaining the operations of the moving-picture processing system shown in FIGS. 2-7.

DESCRIPTION OF THE PREFERRED EMBODIMENTS

Embodiments of the present invention are next described with reference to the accompanying figures.

An outline of the moving-picture processing device of the present invention is first described.

Figure 1:
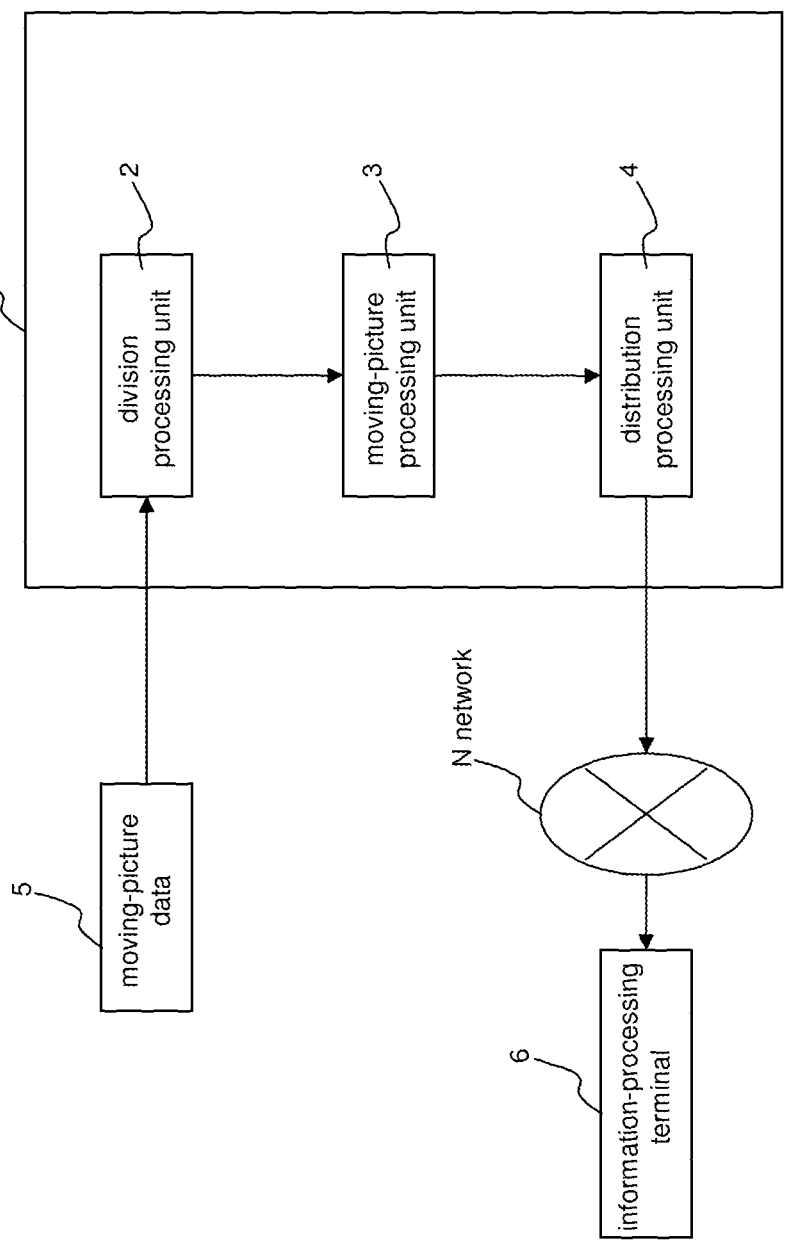
FIG. 1 is a view for explaining an outline of the moving-picture processing device of the present invention.

FIG. 1 is a view for explaining the outline of the moving-picture processing device of the present invention.

As shown in FIG. 1, moving-picture processing device 1 is provided with: division processing unit 2, moving-picture processing unit 3, distribution processing unit 4.

Division processing unit 2 divides moving-picture data 5 that have a data amount corresponding to a predetermined reproduction time.

Moving-picture processing unit 3 implements a distribution process in parallel upon a plurality of divided moving-picture data. The distribution process is a process implemented upon moving-picture data according to the distribution destination of the moving-picture data.

Distribution processing unit 4 sequentially distributes the divided moving-picture data that have undergone the distribution process to information processing terminal 6 that is connected by way of network N.

The foregoing description is the outline of the moving-picture processing device of the present invention.

Figure 2:
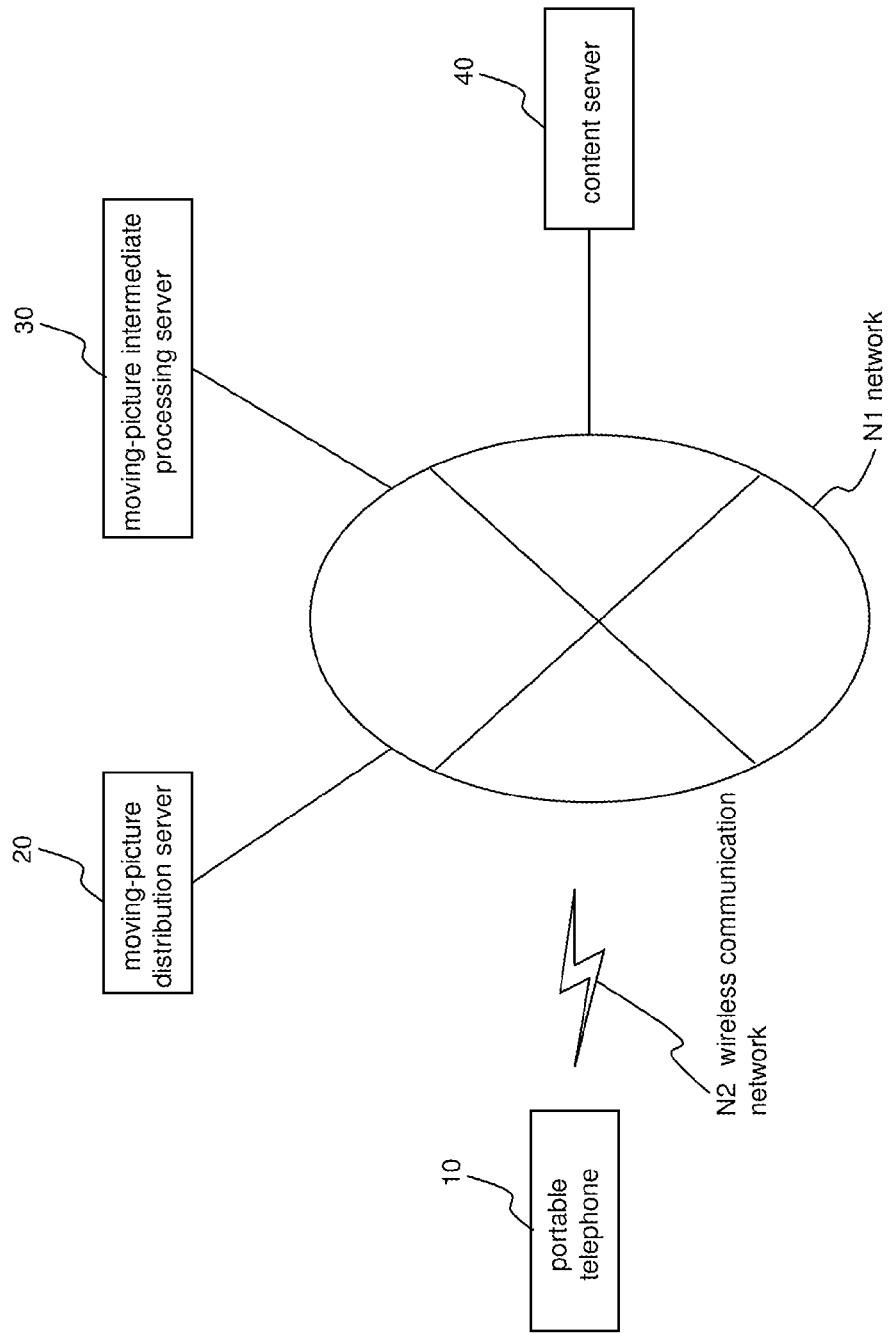
FIG. 2 shows the configuration of an embodiment of the moving-picture distribution system in which the moving-picture processing device of the present invention is applied.

FIG. 2 shows the configuration of an embodiment of the moving picture distribution system in which the moving-picture processing device of the present invention is applied.

In the present embodiment, explanation regards a portable telephone that is offered as an example of the information-processing terminal that is the distribution destination of moving-picture data. However, the information-processing terminal that is the distribution destination of moving-picture data is not limited to a portable telephone, and is not limited to an information-processing terminal that receives the distribution of moving-picture data by way of a radio communication network. In other words, the information-processing terminal that is the distribution destination may be any kind of information processing terminal, and may be a personal computer that is connected by way of a cable network.

(Overall Configuration)

As shown in FIG. 2, the moving picture distribution system of the present embodiment is provided with: portable telephone 10 that is manipulated by a user who views the moving-picture data, moving-picture distribution server 20 and moving-picture intermediate processing server 30 that are moving-picture processing devices, and content server 40 that stores moving-picture data.

Content server 40, moving-picture intermediate processing server 30, and moving-picture distribution server 20 are each connected by way of network N1 such as an Internet network. In addition, portable telephone 10 is connected with moving-picture distribution server 20 by way of network N1 such as the Internet network or portable telephone network and wireless communication network N2. Each device is next described in detail.

(Configuration of the Portable Telephone)

Figure 3:
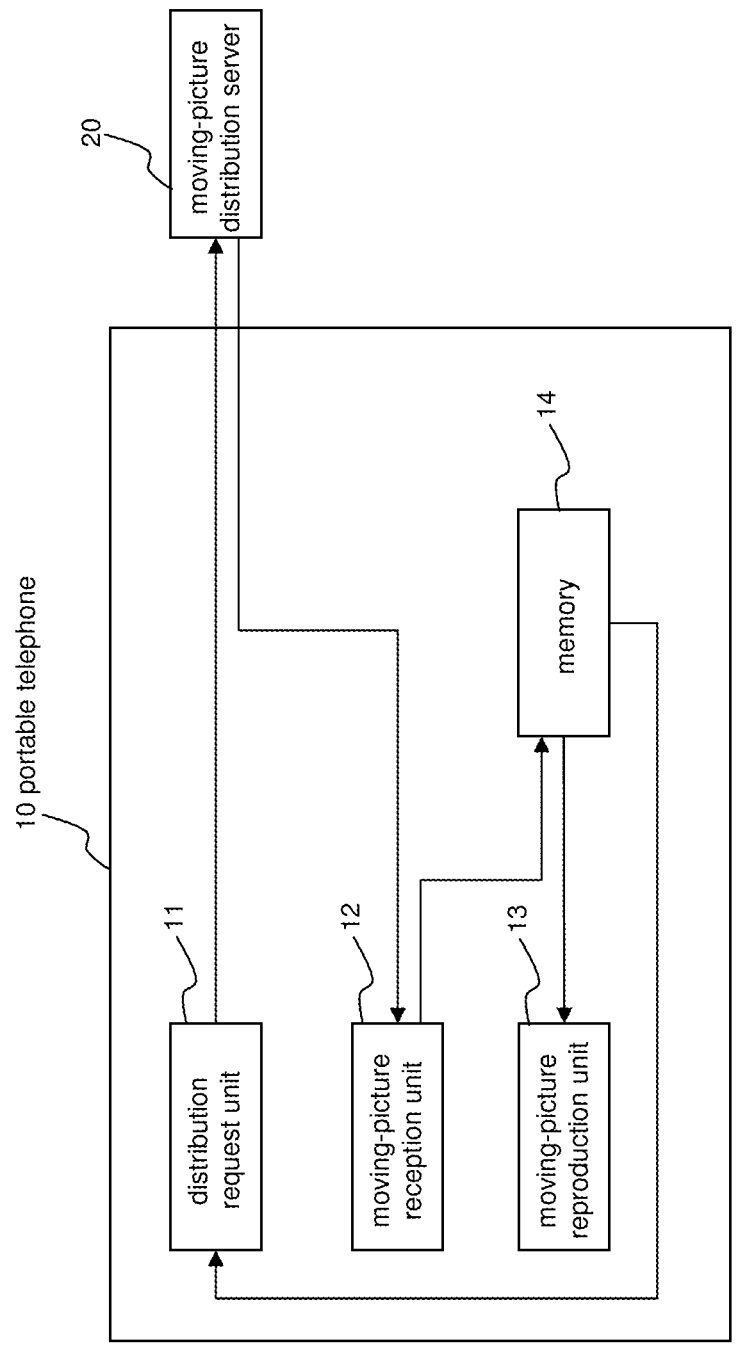
FIG. 3 is a block diagram showing the configuration of the portable telephone shown in FIG. 2.

FIG. 3 is a block diagram showing an example of the configuration of portable telephone 10 shown in FIG. 2.

Portable telephone 10 in the present embodiment is a typical portable telephone provided with, for example, an arithmetic unit, a memory unit, a communication unit, a console unit, and a display unit; is, of course, provided with a communication capability, and is further provided with a data communication capability. In addition, portable telephone 10 is provided with the capability to reproduce moving-picture data that have been distributed from a server computer on a network. Explanation of the basic functions of portable telephone 10 is here omitted.

As shown in FIG. 3, portable telephone 10 shown in FIG. 2 is provided with: distribution request unit 11, moving-picture reception unit 12, and moving-picture reproduction unit 13 that are created by the installation of a program in a CPU (not shown) that is the arithmetic unit; and with memory 14.

Distribution request unit 11 transmits a distribution request to moving-picture distribution server 20. The distribution request is a command for requesting the distribution of moving-picture data that the user wishes to view. The distribution request includes content-specifying information for specifying the content, i.e., moving-picture data. For example, the content-specifying information is generated by a user who accesses a website established by moving-picture distribution server 20 from portable telephone 10 and then selects content the user wishes to see from a content list that is displayed on the website. The distribution request further contains terminal information. The terminal information is information showing the specifications of portable telephone 10, and for example, is model information indicating the model of portable telephone 10 or format information that indicates the format of the moving-picture data that can be reproduced on portable telephone 10. The terminal information is, for example, stored in advance in memory 14. Distribution request unit 11 reads the terminal information that is stored in memory 14 and including the terminal information that was read together with content-specifying information, transmits it to moving-picture distribution server 20. Distribution request unit 11 further, when reproducing moving-picture data that have been distributed, transmits terminal state information, which is one type of terminal information, to moving-picture distribution server 20 at fixed time intervals or at a timing that has been determined in advance. Terminal state information is, for example, reception state information that indicates the reception condition (radio-wave strength) of radio waves for portable telephone 10. Other examples of terminal state information is information indicating the load state of a CPU or information indicating the state of use of resources such as memory use information that indicates the state of storage of moving-picture data in memory 14.

Moving-picture reception unit 12 receives moving-picture data that were distributed from moving-picture distribution server 20 and stores the moving-picture data in memory 14. At this time, moving-picture data of an arbitrary reproduction time are sequentially distributed from moving-picture distribution server 20, and moving-picture reception unit 12 sequentially receives these data.

Moving-picture reproduction unit 13 reproduces the moving-picture data that are stored in memory 14, whereby the user of portable telephone 10 can view the moving-picture data. Moving-picture data that have been reproduced are sequentially discarded.

(Configuration of the Moving Picture Intermediate Processing Server)

Figure 4:
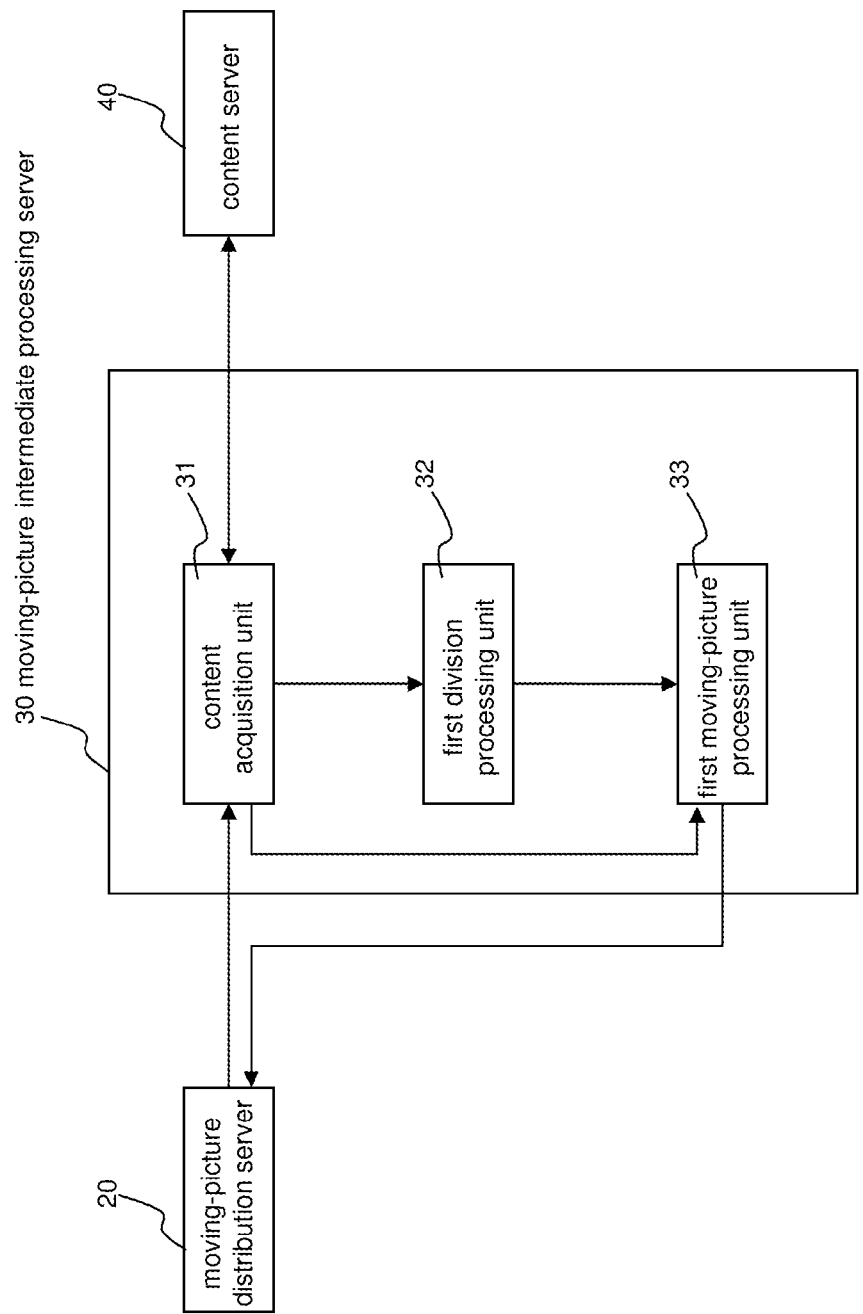
FIG. 4 is a block diagram showing the configuration of the moving-picture intermediate processing server shown in FIG. 2.

FIG. 4 is a block diagram showing an example of the configuration of moving-picture intermediate processing server 30 shown in FIG. 2. Moving-picture intermediate processing server 30 is a typical server computer provided with, for example, an arithmetic unit, a memory unit, and a communication unit.

As shown in FIG. 4, moving-picture intermediate processing server 30 shown in FIG. 2 is provided with: content acquisition unit 31 that is a terminal information acquisition unit, first division processing unit 32, and first moving-picture processing unit 33 that are created by the installation of a program in a CPU, i.e., the arithmetic unit.

Content acquisition unit 31 receives a distribution request that was transmitted from portable telephone 10 by way of moving-picture distribution server 20. A request for the content that was specified by the content-specifying information contained in the received distribution request is then submitted to content server 40. Content server 40, for example, stores moving picture data that is equivalent to the amount of data in a predetermined reproduction time. These moving-picture data are stored in an arbitrary format. From among the stored moving-picture data, content server 40 transmits the moving-picture data that correspond to the requested content to moving-picture intermediate processing server 30 in accordance with the time sequence of the reproduction time of the moving-picture data. Content acquisition unit 31 then receives the moving-picture data that have been transmitted from content server 40 and sequentially supplies the received moving-picture data to first division processing unit 32.

First division processing unit 32 sequentially receives the moving-picture data that were supplied from content acquisition unit 31. First division processing unit 32 then, for each arbitrary data amount, sequentially divides the received moving-picture data in accordance with the time sequence of the reproduction time of the moving-picture data.

Figure 5:
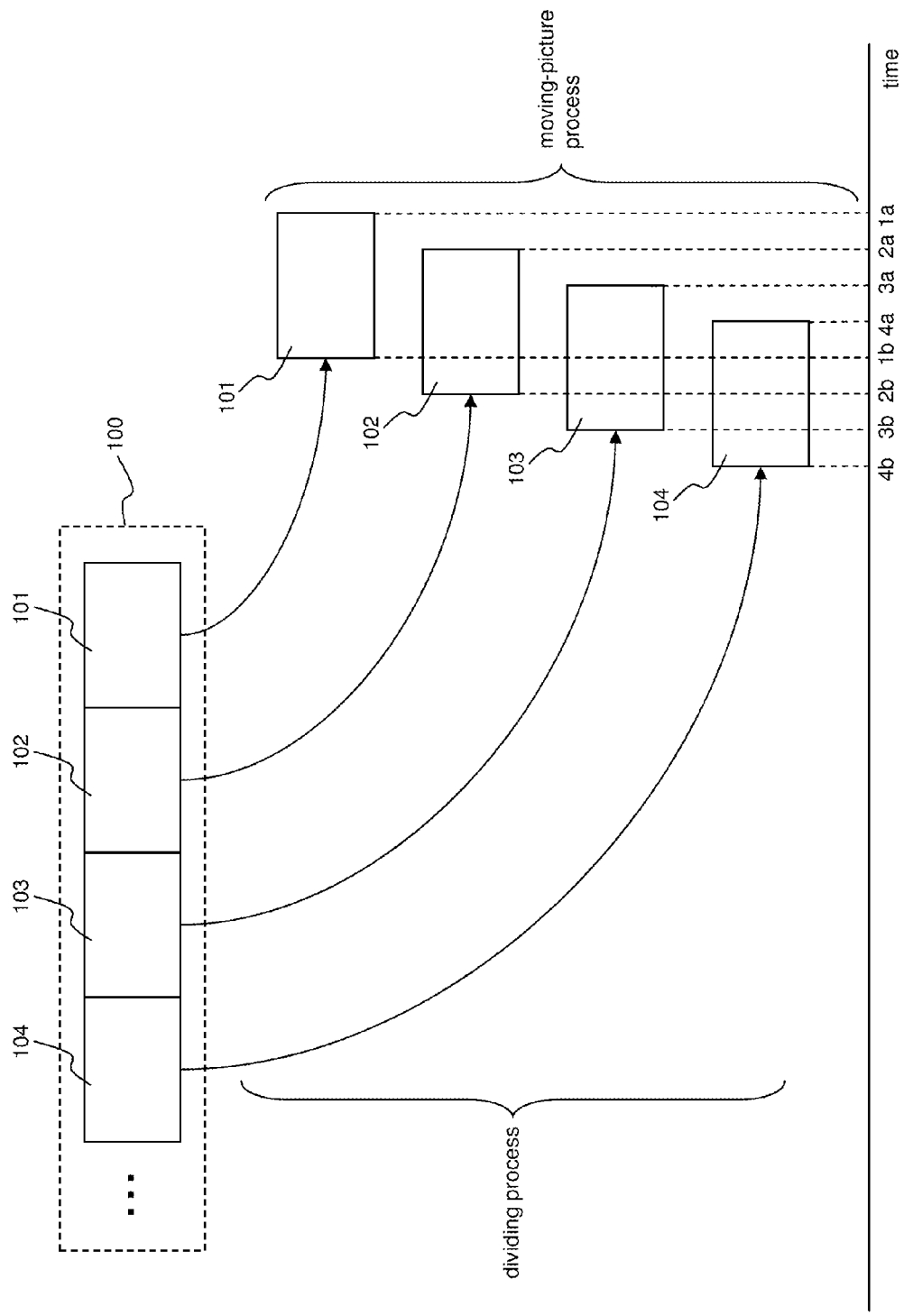
FIG. 5 is a view for explaining the state of processing of moving-picture data by the moving-picture intermediate processing server shown in FIG. 2 and FIG. 4.

FIG. 5 is a view for explaining the state of the processing of moving-picture data by moving-picture intermediate processing server 30 shown in FIG. 2 and FIG. 4.

In FIG. 5, moving-picture data 100 indicates moving-picture data that were received from content server 40 by moving-picture intermediate processing server 30. Moving-picture data 100 are assumed to be reproduced from the right and toward the left of the figure.

First division processing unit 32 sequentially divides received moving-picture data 100 from the earliest reproduction time for each fixed data amount or for each reproduction time, whereby divided moving-picture data 101-104 are generated. Here, divided moving-picture data 101, 102, 103, and 104 are generated in order in the order of reproduction time. Although four items of divided moving-picture data 101-104 are shown in FIG. 5, first division processing unit 32 sequentially divides moving-picture data that are supplied from content acquisition unit 31 to generate divided moving-picture data. First division processing unit 32 then sequentially supplies the divided moving-picture data that have been generated to first moving-picture processing unit 33.

Again, referring to FIG. 4, first moving-picture processing unit 33 subjects each data item of divided moving-picture data 101-104 that are supplied from first division processing unit 32 to a distribution process. At this time, first moving-picture processing unit 33 executes the distribution process upon divided moving-picture data 101-104 in parallel. For example, when moving-picture intermediate processing server 30 is provided with a plurality of CPUs, which are arithmetic units, or when a single CPU is provided with a plurality of cores, which are processing units, each CPU or each core is used to execute in parallel the distribution process upon divided moving-picture data 101-104. In the example shown in FIG. 5, first moving-picture processing unit 33 is provided with, for example, four parallel processing units (CPUs or cores, not shown), and the distribution process is executed in parallel upon each data item of divided moving-picture data 101-104 in these four parallel processing units.

To explain more concretely, each parallel processing unit of first moving-picture processing unit 33 begins implementing the distribution process upon divided moving-picture data immediately after receiving the divided moving-picture data. Accordingly, the process for distribution is started in the order of earlier reproduction time, i.e., in the order of divided moving-picture data 101, 102, 103, and 104. As shown in FIG. 5, implementation of the distribution process upon divided moving-picture data 101 begins at time 1$a$, following which implementation of the process of distribution upon divided moving-picture data 102 begins after a slight delay at time 2$a$. At this time, implementation of the distribution process upon divided moving-picture data 101 that was started earlier has still not been completed, and the distribution process is therefore implemented at the same time in parallel upon divided moving-picture data 101 and divided moving-picture data 102. Similarly, either three or four processes for distribution are executed in parallel at the same time depending on the data amount of each data item of divided moving-picture data 101-104. For example, in the example shown in FIG. 5, implementation of the distribution process upon divided moving-picture data 104 begins (time 4$a$) before time 1$b$ of the completion of the distribution process upon divided moving-picture data 101. As a result, the distribution process is simultaneously implemented in parallel upon divided moving-picture data 101-104.

In first moving-picture processing unit 33, a parallel processing unit that has completed implementation of the distribution process upon a single item of divided moving-picture data immediately begins continuing implementation of the distribution process upon another item of divided moving-picture data that has not undergone the distribution process. For example, in the example shown in FIG. 5, the parallel processing unit that was carrying out implementing the distribution process upon divided moving-picture data 101 subjects the divided moving-picture data that continues after divided moving-picture data 104 to the distribution process.

In addition, as the distribution process, first moving-picture processing unit 33 converts the divided moving-picture data to a common format, which is the format in the stage preceding the reproducible format that can be reproduced in portable telephone 10. This common format is, for example, a format to which moving-picture data must be converted in the process of converting any type of format to moving-picture data.

First moving-picture processing unit 33 then sequentially transmits the divided moving-picture data that have undergone the distribution process to moving-picture distribution server 20. At this time, first moving-picture processing unit 33 may transmit the divided moving-picture data to moving-picture distribution server 20 without alteration, or may rejoin the divided moving-picture data and then transmit it to moving-picture distribution server 20.

First moving-picture processing unit 33 can convert the divided moving-picture data to formats other than the above-described common format. In other words, first moving-picture processing unit 33 can convert the divided moving-picture data to various intermediate data formats according to the data volume or data format when finally distributing it to portable telephone 10.

In this case, content acquisition unit 31 supplies the terminal information contained in the distribution request to first moving-picture processing unit 33 by way of moving-picture distribution server 20. First moving-picture processing unit 33 then receives the terminal information that was supplied from content acquisition unit 31 and subjects the divided moving-picture data to the distribution process based on the content shown in the received terminal information.

For example, based on format information of moving-picture data that can be reproduced on portable telephone 10, first moving-picture processing unit 33 converts the data format of divided moving-picture data to an intermediate data format that can be converted to the data format shown in the format information. Alternatively, first moving-picture processing unit 33 converts the data format of the divided moving-picture data to an intermediate data format that can be converted to moving-picture data of a reproduction quality that accords with the radio-wave reception state of portable telephone 10. For example, when first moving-picture processing unit 33 has received terminal state information that indicates that the radio-wave reception state of portable telephone 10 is poor, moving-picture data of low picture quality are distributed to portable telephone 10 in the end. In this case, first moving-picture processing unit 33 converts the divided moving-picture data to an intermediate data format that can be converted to the moving-picture data of low-picture quality.

(Configuration of Moving-Picture Distribution Server)

Figure 6:
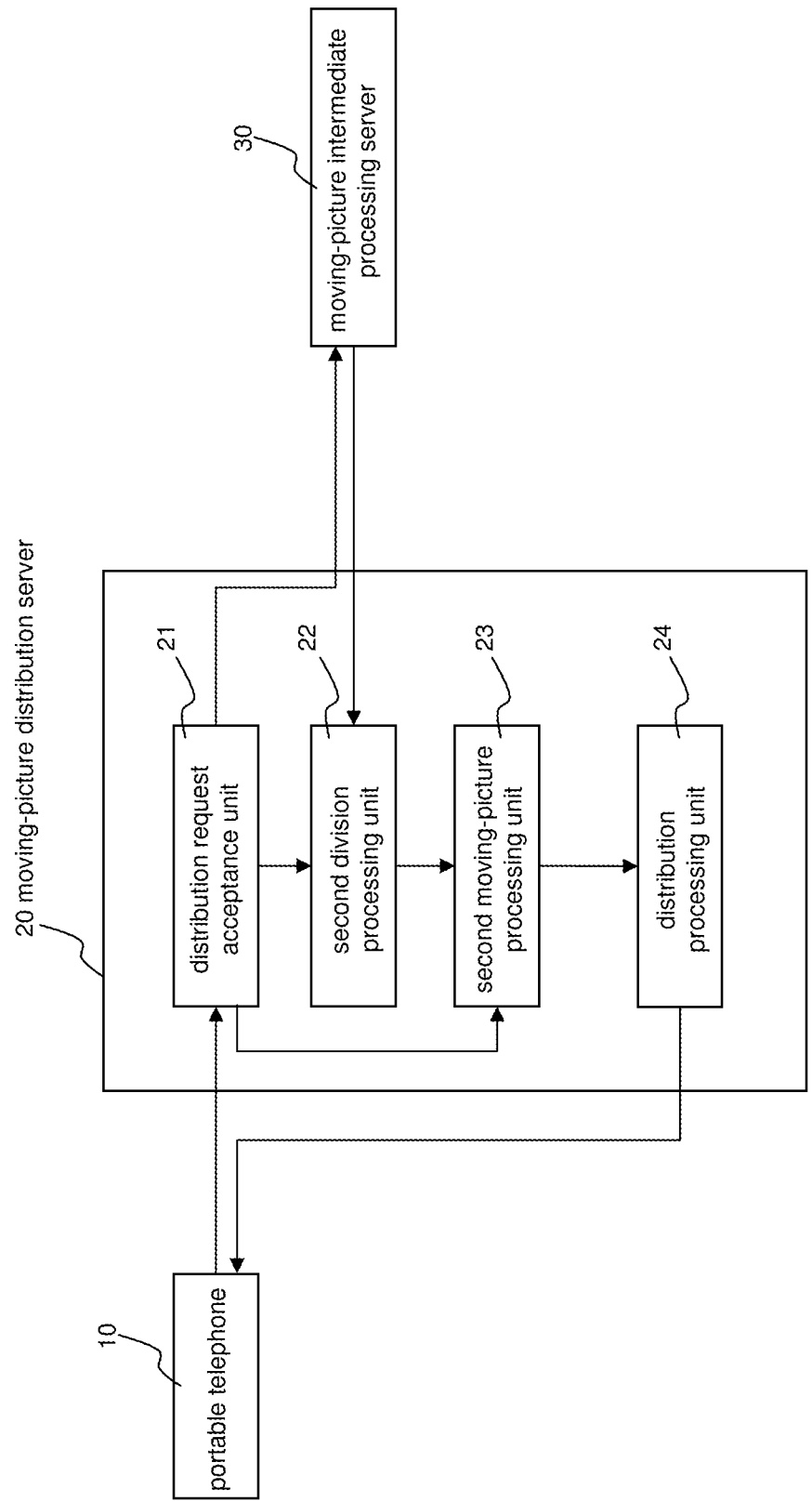
FIG. 6 is a block diagram showing the configuration of moving-picture distribution server 20 shown in FIG. 2.

FIG. 6 is a block diagram showing an example of the configuration of moving-picture distribution server 20 shown in FIG. 2. Moving-picture distribution server 20 is a typical server computer provided with, for example, an arithmetic unit, a memory unit, and a communication unit.

As shown in FIG. 6, moving-picture distribution server 20 shown in FIG. 2 is provided with: distribution request acceptance unit 21 that is the terminal information acquisition unit, second division processing unit 22, second moving-picture processing unit 23, and distribution processing unit 24, these components being created by the installation of a program in the CPU, i.e., the arithmetic unit.

Distribution request acceptance unit 21 receives a distribution request that was transmitted from portable telephone 10. A request for the content that is specified by the content-specifying information that is contained in the received distribution request is then submitted to content server 40 by way of moving-picture intermediate processing server 30.

Second division processing unit 22 receives the moving-picture data that have undergone the distribution process by moving-picture intermediate processing server 30 from moving-picture intermediate processing server 30. Second division processing unit 22 can receive moving picture data in the divided moving-picture data state in which moving-picture data are divided as shown by divided moving-picture data 101-104 (see FIG. 5) and can receive moving picture data when the divided moving-picture data are in the combined state. Second division processing unit 22 then divides the divided moving-picture data that have been received by each data item of an arbitrary data amount according to the time sequence of the reproduction time. Upon receiving divided moving-picture data that have been combined, second division processing unit 22 divides the data into data of shorter reproduction time or smaller amounts of data than the divided moving-picture data.

Figure 7:
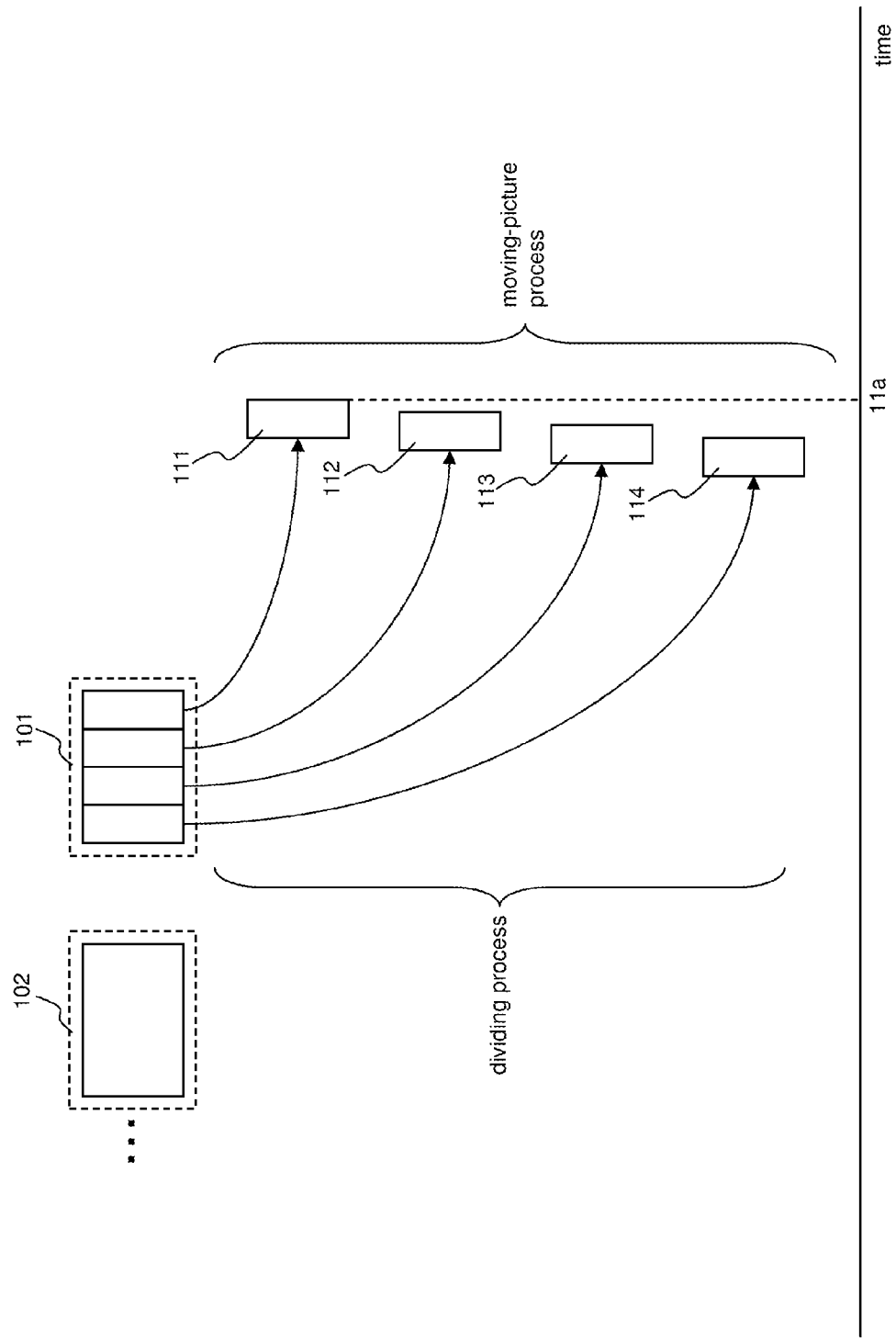
FIG. 7 is a view for explaining the state of processing of moving-picture data by moving-picture distribution server 20 shown in FIG. 2 and FIG. 6.

FIG. 7 is a view for explaining the state in which moving-picture distribution server 20 shown in FIGS. 2 and 6 processes moving-picture data.

In FIG. 7, divided moving-picture data 101 is one item of divided moving-picture data that moving-picture distribution server 20 receives from moving-picture intermediate processing server 30. Divided moving-picture data 101 are assumed to be reproduced from the right and toward the left in the figure.

Second division processing unit 22 sequentially divides divided moving-picture data 101 that were received by each fixed amount of data or reproduction time beginning from portions having earlier reproduction time, whereby re-divided moving-picture data 111-114 are generated. Re-divided moving-picture data are generated in the order of 111, 112, 113, and 114 in the order of earlier reproduction time. Although only four items of re-divided moving-picture data 111-114 are shown in FIG. 7, second division processing unit 22 sequentially divides the divided moving-picture data that are transmitted from moving-picture intermediate processing server 30 to generate re-divided moving-picture data. Second division processing unit 22 then sequentially supplies the re-divided moving-picture data that were generated to second moving-picture processing unit 23.

Again referring to FIG. 6, second moving-picture processing unit 23 subjects each data item of re-divided moving-picture data 111-114 that were supplied from second division processing unit 22 to the distribution process. At this time, second moving-picture processing unit 23 executes the distribution process upon each data item of re-divided moving-picture data 111-114 in parallel. For example, when moving-picture distribution server 20 is provided with a plurality of CPUs that are the arithmetic units or when one CPU is provided with a plurality of cores that are processing units, each CPU or each core is used to execute the distribution process in parallel upon each data item of re-divided moving-picture data 111-114. In the example shown in FIG. 7, second moving-picture processing unit 23 is provided with, for example, four parallel processing units (CPUs or cores; not shown), and in these four parallel processing units, the distribution process is executed upon each data item of re-divided moving-picture data 111-114 in parallel.

To explain more concretely, each of the parallel processing units of second moving-picture processing unit 23 begins implementing the distribution process for the re-divided moving-picture data immediately after having received the re-divided moving-picture data. Accordingly, implementation of the distribution process begins in the order of re-divided moving-picture data 111, 112, 113, and 114 in the order of earlier reproduction time. As shown in FIG. 7, implementation of the distribution process for re-divided moving-picture data 111 first begins at time 11a, following which implementation of the distribution process for re-divided moving-picture data 112 begins after a slight delay. At this time, implementation of the distribution process for re-divided moving-picture data 111 that started earlier is still not completed, and the processes for distribution for re-divided moving-picture data 111 and re-divided moving-picture data 112 are therefore carried out simultaneously and in parallel. In the same way, three or four processes for distribution may be carried out simultaneously and in parallel depending on the data amounts of each data item of re-divided moving-picture data 111-114.

In second moving-picture processing unit 23, a parallel processing unit that has completed implementing the distribution process for one item of re-divided moving-picture data continues by immediately beginning implementation of the distribution process for another re-divided moving-picture data that has not yet undergone the distribution process. For example, in the example shown in FIG. 7, the distribution process is carried for re-divided moving-picture data obtained by dividing divided moving-picture data 102 that was transmitted from moving-picture intermediate processing server 30 following divided moving-picture data 101.

In addition, as the distribution process, second moving-picture processing unit 23 converts the re-divided moving-picture data to the reproducible format that can be reproduced in portable telephone 10. Second moving-picture processing unit 23 then sequentially supplies to distribution processing unit 24 the re-divided moving-picture data that have undergone the distribution process.

Second moving-picture processing unit 23 can further subject the re-divided moving-picture data to a distribution process that accords with the model or state of portable telephone 10. In this case, distribution request acceptance unit 21 supplies as output to second moving-picture processing unit 23 terminal information that are contained in the distribution request that was transmitted from portable telephone 10. Second moving-picture processing unit 23 receives the terminal information that were supplied from distribution request acceptance unit 21 and subjects the re-divided moving-picture data to a distribution process according to the content indicated by the received terminal information. For example, second moving-picture processing unit 23 converts the format of the re-divided moving-picture data to a format that is to be distributed to portable telephone 10 according to model information of portable telephone 10 or to format information of the moving-picture data that can be reproduced on portable telephone 10. Alternatively, second moving-picture processing unit 23 converts the format of the re-divided moving-picture data to a format whose reproduction quality accords with the radio-wave reception state of portable telephone 10. For example, when second moving-picture processing unit 23 receives terminal state information that indicates that the radio-wave reception state of portable telephone 10 is poor, second moving-picture processing unit 23 converts the re-divided moving-picture data to a format of low picture quality.

Distribution processing unit 24 distributes re-divided moving-picture data that were supplied from second moving-picture processing unit 23 and that have undergone the distribution process to portable telephone 10. At this time, distribution processing unit 24 sequentially distributes moving-picture data in arbitrary reproduction time portions, but the data volume distributed at one time may be a fixed value that was determined in advance or may change according to the terminal state information transmitted from portable telephone 10. For example, distribution processing unit 24 may distribute each item of the re-divided moving-picture data that have undergone the distribution process without alteration, or may combine a plurality of items of re-divided moving-picture data that have undergone the distribution process and then distribute combined re-divided moving-picture data.

(Operation)

Explanation next regards the operations of the moving-picture distribution system that is configured as described above.

The operations from the transmission of a distribution request from portable telephone 10 up to the start of reproduction of moving-picture data in portable telephone 10 will first be explained.

Figure 8:
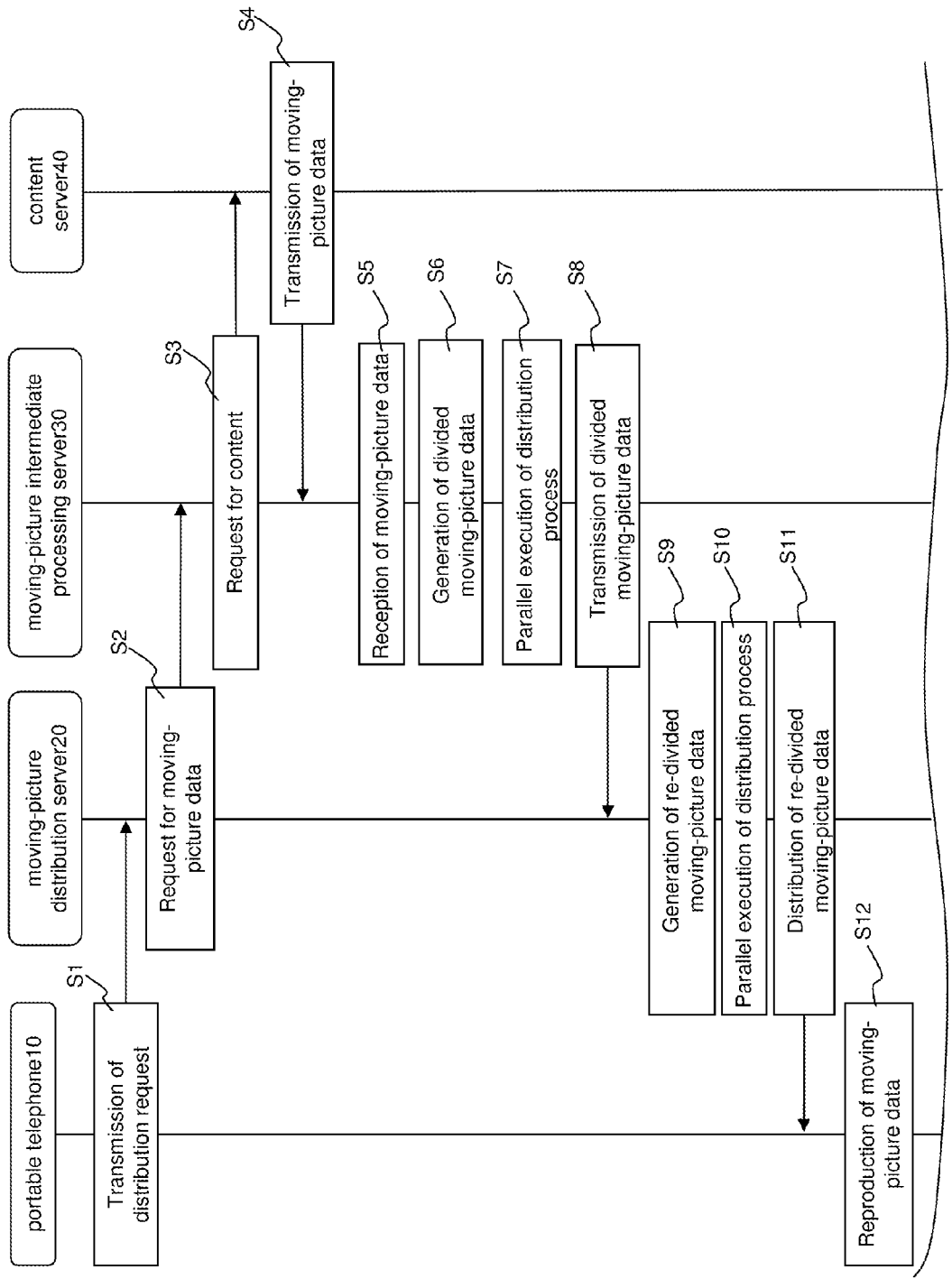
FIG. 8 is a sequence chart for explaining the operation of the moving-picture distribution system shown in FIGS. 2-7.

FIG. 8 is a sequence chart for explaining the operations of the moving-picture distribution system shown in FIGS. 2-7.

The user of portable telephone 10 first manipulates portable telephone 10 to access a website that is established by moving-picture distribution server 20 and then selects content on the website that the user wishes to view.

Distribution request unit 11 of portable telephone 10 accordingly transmits a distribution request to moving-picture distribution server 20 in Step S1.

Distribution request acceptance unit 21 of moving-picture distribution server 20 receives the distribution request that was transmitted from portable telephone 10.

Then, in Step S2, distribution request acceptance unit 21 transfers the received distribution request to submit a request to moving-picture intermediate processing server 30 for moving-picture data. At this time, content-specifying information, model information of portable telephone 10, and format information of moving-picture data that can be reproduced in portable telephone 10 that are contained in the distribution request are transferred to moving-picture intermediate processing server 30.

Content acquisition unit 31 of moving-picture intermediate processing server 30 receives the distribution request that was transmitted from portable telephone 10 by way of moving-picture distribution server 20.

In Step S3, content acquisition unit 31 next submits a request to content server 40 for the content that is specified by the content-specifying information contained in the received distribution request.

In Step S4, content server 40 accordingly reads the moving-picture data that are the requested content from a database that stores various content and transmits the moving-picture data that were read to moving-picture intermediate processing server 30.

Content server 40 then sequentially transmits to moving-picture intermediate processing server 30 the moving-picture data that were stored, not as a single unified file, but rather, by an arbitrary data amount and in accordance with a time sequence from the start of the moving-picture data.

In Step S5, content acquisition unit 31 of moving-picture intermediate processing server 30 receives the moving-picture data that were sequentially transmitted from content server 40.

Content acquisition unit 31 then supplies the received moving-picture data to first division processing unit 32.

First division processing unit 32 receives the moving-picture data that were supplied from content acquisition unit 31.

Next, in Step S6, first division processing unit 32 sequentially generates divided moving-picture data by sequentially dividing the received moving-picture data for each arbitrary data amount (reproduction time portion) from the start of the data and in accordance with the time sequence.

First division processing unit 32 then sequentially supplies each data item of the generated divided moving-picture data to first moving-picture processing unit 33.

First moving-picture processing unit 33 sequentially receives the divided moving-picture data that were supplied from first division processing unit 32.

In Step S7, first moving-picture processing unit 33 executes in parallel the distribution process upon each data item of the received divided moving-picture data that were received. More specifically, as described with reference to FIG. 5, first moving-picture processing unit 33 begins implementation of the distribution process upon the divided moving-picture data immediately after first division processing unit 32 generates the divided moving-picture data. As a result, implementation of the distribution process for each data item of the divided moving-picture data begins in the order of earlier reproduction time. The distribution process is thus implemented simultaneously and in parallel for different points of the same moving-picture data. It is here assumed that the format of the divided moving-picture data is converted to the above-described common format.

First moving-picture processing unit 33 then sequentially transmits each data item of the divided moving-picture data that have undergone the distribution process to moving-picture distribution server 20 in Step S8.

Second division processing unit 22 of moving-picture distribution server 20 receives the divided moving-picture data that are transmitted from moving-picture intermediate processing server 30.

In Step S9, second division processing unit 22 sequentially generates re-divided moving-picture data by further dividing the divided moving-picture data for each arbitrary data amount in accordance with the time sequence from the start of the received moving-picture data.

Second division processing unit 22 then sequentially supplies the re-divided moving-picture data that were generated to second moving-picture processing unit 23.

Second moving-picture processing unit 23 sequentially receives the re-divided moving-picture data that were supplied from second division processing unit 22.

In Step S10, second moving-picture processing unit 23 executes in parallel the distribution process for each data item of the re-divided moving-picture data that were received. More specifically, as explained with reference to FIG. 7, second moving-picture processing unit 23 begins implementation of the distribution process upon the re-divided moving-picture data immediately after second division processing unit 22 generates re-divided moving-picture data. As a result, implementation of the distribution process for each data items of the re-divided moving-picture data begins in the order of earlier reproduction times. The distribution process is implemented simultaneously in parallel for different points among the same moving-picture data. The format of the re-divided moving-picture data is here converted to the above-described reproducible format.

Second moving-picture processing unit 23 then sequentially supplies the re-divided moving-picture data that have undergone the distribution process to distribution processing unit 24.

Distribution processing unit 24 receives the re-divided moving-picture data that were supplied from second moving-picture processing unit 23.

In Step S11, distribution processing unit 24 next distributes to portable telephone 10, in arbitrary reproduction time portions, the re-divided moving-picture data that were received.

Moving-picture reception unit 12 of portable telephone 10 receives the moving-picture data that were distributed from moving-picture distribution server 20 and supplies the received moving-picture data to memory 14.

In Step S12, moving-picture reproduction unit 13 then reproduces the moving-picture data that are stored in memory 14, whereby the user of portable telephone 10 is able to view the moving picture of the requested content.

The operations when portable telephone 10 transmits terminal state information while reproducing a moving picture are next described.

FIG. 9 is a sequence chart for explaining the operations of the moving-picture processing system shown in FIGS. 2-7.

In Step S13, distribution request unit 11 of portable telephone 10 gathers terminal state information that indicates the state of its own portable telephone 10 at fixed time intervals or at a timing that is determined in advance.

In Step S14, distribution request unit 11 transmits the gathered terminal state information to moving-picture distribution server 20.

Distribution request acceptance unit 21 of moving-picture distribution server 20 receives the terminal state information that was transmitted from portable telephone 10.

In Step S15, distribution request acceptance unit 21 both transmits the received terminal state information to moving-picture intermediate processing server 30 and supplies the terminal state information to second moving-picture processing unit 23.

Content acquisition unit 31 of moving-picture intermediate processing server 30 that has received the terminal state information that was transmitted from moving-picture distribution server 20 supplies the terminal state information that was received to first moving-picture processing unit 33.

In Step S16, first division processing unit 32 generates divided moving-picture data similar to the operation of Step S6 in the above-described operation flow and sequentially supplies to first moving-picture processing unit 33 each of the data items of divided moving-picture data that were generated.

First moving-picture processing unit 33 receives the terminal state information that was supplied from content acquisition unit 31.

In Step S17, based on the state of portable telephone 10 that was indicated by the terminal state information that was received, first moving-picture processing unit 33 next implements the distribution process upon the divided moving-picture data. For example, when first moving-picture processing unit 33 has received terminal state information indicating that the radio-wave reception state of portable telephone 10 is poor, first moving-picture processing unit 33 converts the divided moving-picture data to an intermediate data format that can be converted to moving-picture data of low image quality.

In Step S18, first moving-picture processing unit 33 transmits the divided moving-picture data that have undergone the distribution process to moving-picture distribution server 20.

Second division processing unit 22 of moving-picture distribution server 20 receives the divided moving-picture data that were transmitted from moving-picture intermediate processing server 30.

In Step S19, second division processing unit 22 hereupon generates re-divided moving-picture data similar to the operation of Step S9 in the above-described operation flow and sequentially supplies each data item of the re-divided moving-picture data that were generated to second moving-picture processing unit 23.

Second moving-picture processing unit 23 receives the re-divided moving-picture data that were supplied from second division processing unit 22.

In Step S20, second moving-picture processing unit 23 next subjects the re-divided moving-picture data to the distribution process based on the terminal state information that was supplied from distribution request acceptance unit 21. For example, when second moving-picture processing unit 23 receives terminal state information indicting that the radio-wave reception condition of portable telephone 10 is poor, second moving-picture processing unit 23 converts each data item of re-divided moving picture data to a data format of low image quality.

In Step S21, distribution processing unit 24 then distributes the re-divided moving-picture data that have undergone the distribution process to portable telephone 10.

In Step S22, portable telephone 10 then receives and reproduces the moving-picture data that were distributed, whereby the user is able to view the moving-picture data of the requested content.

In the present embodiment of this configuration, moving-picture intermediate processing server 30 and moving-picture distribution server 20 divide the moving-picture data and execute processes for distribution in parallel upon each data item of the divided moving-picture data and re-divided moving-picture data that have been divided. As a result, the time of the distribution process can be reduced. In addition, implementing the distribution process by dividing it into two stages enables a further reduction of the time for the distribution process. In this way, the time from the transmission of a distribution request from portable telephone 10 until the reproduction of moving-picture data in portable telephone 10 can be shortened.

The present embodiment can therefore achieve an improvement in the degree of user satisfaction when viewing moving-picture data that have been distributed.

In addition, having received terminal state information transmitted from portable telephone 10, moving-picture intermediate processing server 30 and moving-picture distribution server 20 are able to distribute moving-picture data without delay based on the state of portable telephone 10 that is indicated in the terminal state information. In particular, application of the present embodiment when distributing moving pictures to portable telephone 10 that is connected to a wireless network enables distribution without delay of moving-picture data that accords with changes in the radio-wave conditions.

As a result, the present embodiment can achieve a further improvement in the degree of user satisfaction when viewing moving-picture data that have been distributed.

Although a configuration has been shown in the present embodiment in which the distribution process and the distribution of moving-picture data are realized by means of moving-picture distribution server 20 and moving-picture intermediate processing server 30, the configuration of the present invention is not limited to this form. For example, each of the capabilities provided in moving-picture distribution server 20 and moving-picture intermediate processing server 30 may be provided in, for example, an information processing device, or may be provided by being dispersed among a multiplicity of information processing devices.

Although a case has been described in the present embodiment in which moving-picture data that are distributed are stored in advance in a content server 40, the moving-picture data that are distributed need not be stored in advance. For example, moving-picture intermediate processing server 30 may directly accept the input of moving-picture data that are being captured, may convert the accepted moving-picture data to a format that corresponds to a portable telephone that has transmitted in a distribution request, and then may distribute the moving-picture data. In this way, the present invention can be adapted to the distribution of a wide variety of content and can also be adapted to distribution to a wide variety of information processing terminals.

Finally, the present invention can be applied in a server computer that distributes moving-picture data by way of a network and therefore has potential utility in industry.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A moving-picture processing device distributing moving-picture data to an information processing terminal, comprising:

a division processing unit generating a plurality of divided moving-picture data obtained by dividing said moving-picture data;

a moving-picture processing unit subjecting each data item of said plurality of divided moving-picture data to a distribution process for distributing said moving-picture data;

a distribution processing unit sequentially distributing, each data item of said plurality of divided moving-picture data that have undergone said distribution process to said information processing terminal as distribution data;

a second division processing unit further dividing each data item of said plurality of divided moving-picture data that have undergone said distribution process to generate a plurality of re-divided moving-picture data; and a second moving-picture processing unit subjecting each data item of said plurality of re-divided moving-picture data to said distribution process;

wherein said moving-picture processing unit executes said distribution process in parallel;

said distribution processing unit sequentially distributes each data item of said plurality of re-divided moving-picture data that have undergone said distribution process to said information processing terminal as said distribution data;

said moving-picture processing unit, in said distribution process, converts the format of said divided moving-picture data to a common format, which is the format in the stage preceding a reproducible format that can be reproduced in said information processing terminal; and said second moving-picture processing unit, in said distribution process, converts the format of said re-divided moving-picture data to said reproducible format.

2. The moving-picture processing device according to claim 1, wherein:

said division processing unit divides said moving-picture data sequentially during reproduction of the moving-picture data; and said moving-picture processing unit implements said distribution process sequentially.

3. The moving-picture processing device according to claim 1, wherein, immediately after said divided moving-picture data have been generated by said division processing unit, said moving-picture processing unit subjects the divided moving-picture data that have been generated to said distribution process.

4. The moving-picture processing device according to claim 1, further comprising:

a terminal information acquisition unit receiving terminal information that is transmitted from said information processing terminal and that indicates the specifications and/or state of the information-processing terminal, and for supplying the terminal information that was received;

wherein:

said moving-picture processing unit receives terminal information that was supplied from said terminal information acquisition unit and, based on the content indicated by said terminal information that was received, subjecting each data item of said plurality of divided moving-picture data to said distribution process; and said second moving-picture processing unit receives terminal information supplied from said terminal information acquisition unit and, based on the content indicated by the terminal information that was received, subjecting each data item of said plurality of re-divided moving-picture data to said distribution process.

5. The moving-picture processing device according to claim 4, wherein said terminal information is information specifying the format of moving-picture data that can be reproduced on said information processing terminal.

6. The moving-picture processing device according to claim 4, wherein said terminal information is information indicating the communication state in said information processing terminal.

7. The moving-picture processing device according to claim 1, wherein said distribution processing unit sequentially distributes said distribution data to said information processing terminal that is connected by way of a wireless network.

8. A moving-picture processing method in a moving-picture processing device for distributing moving-picture data to an information processing terminal, comprising:
 a dividing process of generating a plurality of divided moving-picture data obtained by dividing said moving-picture data;
 a moving-picture process of executing in parallel a distribution process that is implemented upon each data item of said plurality of divided moving-picture data to distribute said moving-picture data;
 a moving-picture data distribution process of sequentially distributing, for each arbitrary data amount as distribution data to said information processing terminal, each data item of said plurality of divided moving-picture data that have undergone said distribution process;
 a process of generating a plurality of re-divided moving-picture data obtained by further dividing each data item of said plurality of divided moving picture data that have undergone said distribution process; and
 a process of executing, in parallel, said distribution process upon each data item of said plurality of re-divided moving-picture data,
 wherein said moving-picture data distribution process is a process of sequentially distributing, by each arbitrary data amount as said distribution data to said information processing terminal, each data item of said plurality of re-divided moving-picture data that have undergone said distribution process.

9. The moving-picture processing method according to claim 8, wherein:
 said dividing process is a process of generating said plurality of divided moving-picture data by dividing said moving-picture data sequentially during reproduction of the moving-picture data; and
 said moving-picture process is a process of implementing said distribution process sequentially.

* * * * *